United States Patent
Salter et al.

(10) Patent No.: US 10,807,567 B2
(45) Date of Patent: Oct. 20, 2020

(54) VEHICLE PROXIMITY TRACKING

(71) Applicant: Ford Global Technologies, LLC, Dearborn, MI (US)

(72) Inventors: Stuart C. Salter, White Lake, MI (US); Paul Kenneth Dellock, Northville, MI (US); Pietro Buttolo, Dearborn Heights, MI (US); James J. Surman, Clinton Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/485,968

(22) PCT Filed: Feb. 21, 2017

(86) PCT No.: PCT/US2017/018750
§ 371 (c)(1),
(2) Date: Aug. 14, 2019

(87) PCT Pub. No.: WO2018/156105
PCT Pub. Date: Aug. 30, 2018

(65) Prior Publication Data
US 2020/0231124 A1    Jul. 23, 2020

(51) Int. Cl.
*B60R 25/30* (2013.01)
*B60R 25/01* (2013.01)
*B60R 25/102* (2013.01)
*G01S 11/06* (2006.01)

(52) U.S. Cl.
CPC ............ *B60R 25/305* (2013.01); *B60R 25/01* (2013.01); *B60R 25/102* (2013.01); *G01S 11/06* (2013.01)

(58) Field of Classification Search
CPC .................................. B60Q 1/26; H02H 3/00
See application file for complete search history.

(56) References Cited

U.S. PATENT DOCUMENTS

| 3,723,677 A * | 3/1973 | Arias .................... B60R 25/021 |
| | | 200/43.04 |
| 8,552,863 B2 | 10/2013 | Kumbhar et al. |
| 9,002,372 B2 | 4/2015 | Shakespeare et al. |
| 9,100,788 B2 | 8/2015 | Karam et al. |
| 2007/0200669 A1* | 8/2007 | McBride ............ G07C 9/00309 |
| | | 340/5.72 |

(Continued)

OTHER PUBLICATIONS

Notification of Transmittal of International Search Report and Written Opinion of International Searching Authority dated May 4, 2017 regarding International Application No. PCT/US2017/018750 (14 pages).
Libelium World, "Vehicle Traffic Monitoring Platform with Bluetooth Sensors over ZigBee", Oct. 14, 2011, retrieved from Internet URL: http://www.libelium.com/vehicle_traffic_monitoring_bluetooth_sensors_over_zigbee (3 pages).

(Continued)

*Primary Examiner* — Nabil H Syed
*Assistant Examiner* — Cal J Eustaquio
(74) *Attorney, Agent, or Firm* — Brandon Hicks; Bejin Bieneman PLC

(57) ABSTRACT

A computer is programmed to receive, via a vehicle wireless receiver, a wireless signal from a mobile device, and determine a presence of the mobile device within a distance of the vehicle. The computer is programmed to classify a movement of the mobile device based at least on the determined device presence, and actuate a vehicle component based on the determined device presence and the classified movement of the mobile device.

20 Claims, 9 Drawing Sheets

(56) References Cited

U.S. PATENT DOCUMENTS

| | | |
|---|---|---|
| 2008/0042489 A1* | 2/2008 | Lewis ............... B60W 10/184 |
| | | 303/152 |
| 2010/0271214 A1 | 10/2010 | Frederick |
| 2011/0169874 A1 | 7/2011 | van Os |
| 2012/0197484 A1 | 8/2012 | Nath et al. |
| 2012/0316768 A1 | 12/2012 | Haran |
| 2014/0306799 A1 | 10/2014 | Ricci |
| 2015/0050923 A1 | 2/2015 | Tu et al. |
| 2015/0161834 A1 | 6/2015 | Spahl et al. |
| 2015/0266452 A1 | 9/2015 | Sik |
| 2015/0348417 A1* | 12/2015 | Ignaczak ............... G08G 1/166 |
| | | 340/435 |
| 2016/0189510 A1 | 6/2016 | Hutz |

OTHER PUBLICATIONS

Dee Andrews, "Mobile Information Devices, The Hidden Threat Within", www.cellbusters.com (15 pages).

Barahim, et. al., "Low-Cost Bluetooth Mobile Positioning for Location-Based Application", IEEE vol. 1-4244-1007-X/07, 2007 (4 pages).

Alhamoud, et. al., "Presence Detection, Identification and Tracking in Smart Home Utilizing Bluetooth Enabled Smartphones", IEEE 13th Annual Workshop on Wireless Local Networks, Edmonton, Canada, IEEE vol. 978-1-4799-3784-4/14, 2014 (6 pages).

Byagowi, et. al., "Bluetooth as a Victim Detection Sensor", IEEE vol. 978-1-4799-0164-4/12, 2012 (2 pages).

* cited by examiner

VEHICLE PROXIMITY TRACKING

BACKGROUND

Parked or slow-moving vehicles can pose security risks. A person intending to break into a vehicle, conduct an assault, robbery car-jacking etc., may lurk in a parking lot or garage, or around an intersection where a vehicle may slow or stop. Often such persons proximate to a vehicle can go undetected. Existing monitoring devices such as cameras may be unmonitored or simply unavailable; it may be impractical or impossible to have cameras or other sensors in all locations where monitoring for presence of persons proximate to a vehicle may be useful. A current problem is that technical architectures for more complete and reliable security monitoring and response proximate to a vehicle is lacking.

DETAILED DESCRIPTION

Introduction

Figure 1:
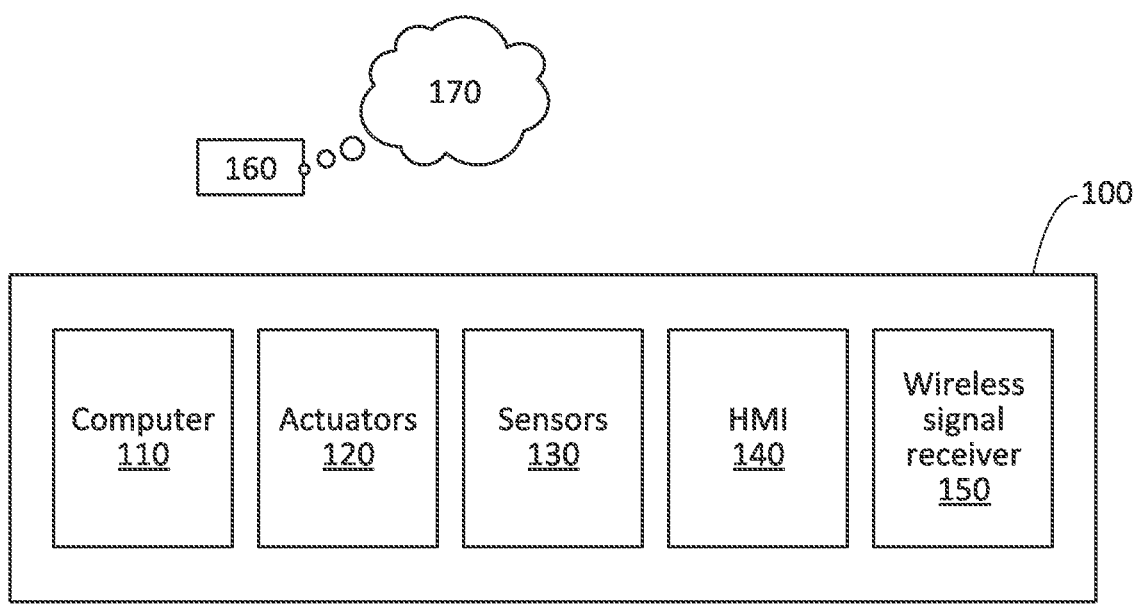
FIG. 1 is a block diagram of an exemplary vehicle system.

Disclosed herein is a method comprising receiving, via a vehicle wireless receiver, a wireless signal from a mobile device, determining a presence of the mobile device within a distance of the vehicle, classifying a movement of the mobile device based at least on the determined device presence, and actuating a vehicle component based on the determined device presence and the classified movement of the mobile device.

Classifying the movement of the mobile device may include determining whether the mobile device is at least one of stationary, approaching the vehicle, moving away from the vehicle, repetitively approaching and moving away from the vehicle, and circling the vehicle.

The method may further include determining whether a mobile device circles the vehicle based on received signal strength associated with the mobile device and vehicle dimensions.

The method may further include storing an identifier of the mobile device upon stopping the vehicle in a location, and estimating a risk level associated with the mobile device based on the stored identifier and a duration of time that the mobile device is proximate to the vehicle. In one example, the method may further include classifying the movement of the mobile device by tracking the mobile device based on the stored identifier of the mobile device. In another example, the method may further include determining whether the mobile device approaches and moves away from the vehicle two or more times by determining whether a newly detected mobile device has been previously detected in a detection range of the mobile device partially based on the stored identifier of the mobile device. The method may further include determining whether a mobile device repetitively approaches and moves away from the vehicle by determining whether a newly detected mobile device has been previously detected in a detection range of the mobile device partially based on the stored identifier of the mobile device.

Classifying the movement of the mobile devices may be based on a change of the distance of the mobile device over time.

The method may further include classifying the movement of the mobile device based on a change of the distance of the mobile device over time, and actuate the vehicle component based at least in part on the classified movement.

The method may include receiving a plurality of respective wireless signals from each of a plurality of mobile devices, determining a distance of each of the plurality of mobile devices to the vehicle based at least on a respective signal strength, and classifying the movement of each of the plurality of the mobile devices based at least in part on the determined distance of the respective mobile device.

Actuating the vehicle component may further include actuating at least one of a recording device to record image data received from a vehicle camera, a transmitter to transmit data to a vehicle owner device, a second computer, and a vehicle flash light to illuminate.

The method may further include estimating a risk for one or more regions of interest, and transmitting the estimated risk level of each of the one or more regions of interest to a display device.

The method may further include estimating a risk associated with the mobile device based at least in part on one of a distance of the mobile device to the vehicle, the classified movement of the mobile device, and a duration of presence in a distance of the vehicle.

The method may further include receiving location coordinates of a user device associated with a vehicle, estimating a risk associated with the mobile device based at least in part on one of the distance of the mobile device to the vehicle and the classified movement of the mobile device. The method may further include transmitting an alert to the user device upon determining, based on the received location coordinates, that a distance between the user device and the vehicle is less than a distance threshold, and the estimated risk exceeds a predetermined risk threshold.

Further disclosed is a computing device programmed to execute the any of the above method steps.

Yet further disclosed is a computer program product, comprising a computer readable medium storing instructions executable by a computer processor, to execute any of the above method steps.

Exemplary System Elements

FIG. 1 is a block diagram of a host vehicle 100. The host vehicle 100 may be powered in variety of known ways, e.g., with an electric motor and/or internal combustion engine. The host vehicle 100 may include a computer 110, actuator(s) 120, sensor(s) 130, a human machine interface (HMI) 140, and a wireless signal receiver 150, each of which are discussed in more detail below.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion (e.g., via a powertrain including an electric motor and/or an internal combustion engine), braking, and steering are controlled by the computer 110; in a semi-autonomous mode the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 is generally arranged for communications on a vehicle communication network, e.g., including a communication bus such as a controller area network (CAN) or the like. The computer 110 may include or be communicatively coupled to, e.g., via a vehicle communications bus as described further below, more than one processor, e.g., controllers or the like included in the vehicle for monitoring and/or controlling various subsystems such as a powertrain, brake, steering, etc.

Via the vehicle network, the computer 110 may transmit messages to various devices in the vehicle 100 and/or receive messages from the various devices, e.g., controllers, actuators, sensors, etc., including sensors 130. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle communication network.

In addition, the computer 110 may be configured for communicating through a wireless communication interface with a remote computer 160, second vehicles 200, mobile devices 240, etc. (see FIG. 2). The wireless communication interface may communicate via a communication network 170. The communication network 170 may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular such as Long-Term Evolution (LTE), Bluetooth™ IEEE 802.11, dedicated short range communications (DSRC), and/or wide area networks (WAN), including the Internet, providing data communication services.

The wireless communication interface may include known electronic circuitry such as a wireless (or radio frequency) signal transmitter, a wireless (or radio frequency) signal receiver 150, and an amplifier circuit to boost an outgoing and incoming radio frequency signal. The vehicle 100 computer 110 may be programmed to receive a wireless signal, via the wireless signal receiver 150. The computer 110 may be programmed to identify an identifier of a device such as a mobile device 240 transmitting wireless signals based on the received wireless signal. The wireless signal receiver 150 may be configured to receive wireless signals based on various wireless communication protocols, e.g., LTE, Bluetooth™, WAN, etc.

Sensors 130 may include a variety of devices known to provide data via the vehicle communications bus. For example, the sensors 130 may include one or more cameras, radars, and/or Light Detection and Ranging (LIDAR) sensors disposed in the vehicle 100 providing data encompassing at least some of the vehicle exterior. The data may be received by the computer 110 through a suitable interface such as is known.

The sensors 130 may also include a GPS (global positioning system) device. A GPS sensor 130 may transmit, e.g., via the computer 110, current geographical coordinates, e.g., latitude and longitude as are known, of the vehicle 100.

The actuators 120 typically include circuits, chips, or other electronic components that can actuate various vehicle subsystems in accordance with appropriate control signals as is known. For instance, the actuators 120 may include one or more relays, servomotors, etc. The actuators 120, therefore, may be used to control braking, acceleration, and steering of the host vehicle 100. The control signals used to control the actuators 120 may be generated by the computer 110, a control unit located in the vehicle 100, e.g., the brake controller, etc., or a second vehicle 200.

The HMI 140 may be configured to receive user input, e.g., during operation of the vehicle 100. As one example, an HMI 140 may include touchscreens, buttons, knobs, keypads, microphone, and so on for receiving information from a user. Moreover, an HMI 140 may include various interfaces such a Ford SYNC® computing interface, a smart phone, etc., for receiving information from a user and/or output information to the user. The computer 110 may be programmed to receive configuration data via the HMI 140. For example, the computer 110 may be programmed to receive data including an identifier of a mobile device 280 associated with the vehicle 100, e.g., a smart phone of a vehicle 100 user 210. As another example, as discussed below, the computer 110 may be programmed to receive configuration data, e.g., a risk threshold, a distance threshold, etc., as discussed below with reference to FIGS. 8A-8B.

Figure 2:
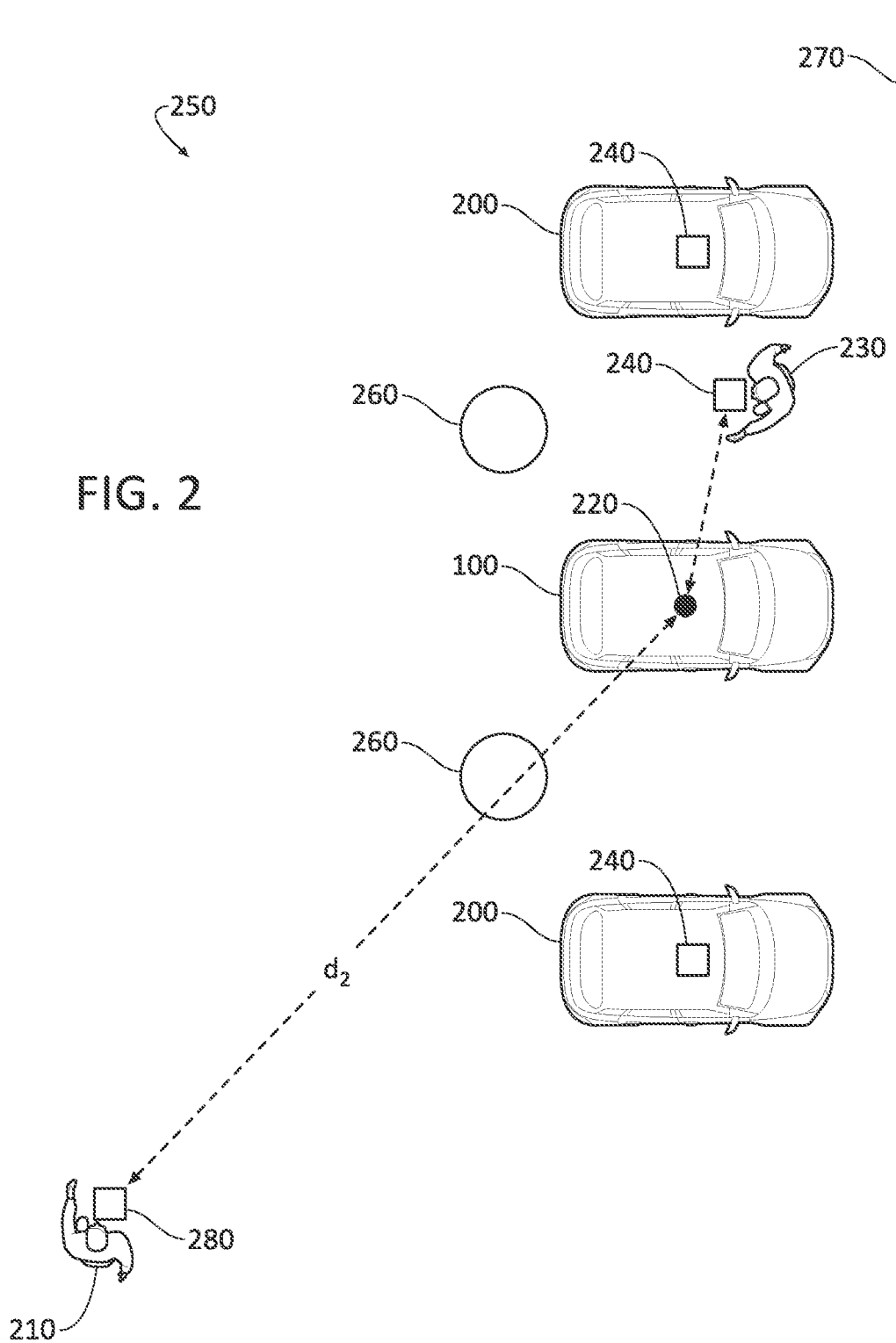
FIG. 2 is a diagram showing vehicles and mobile devices in an exemplary parking garage.

With reference to FIG. 2, the computer 110 may be programmed to receive, via the vehicle wireless signal receiver 150, a wireless signal from the mobile device 240, and determine a presence of the mobile device 240 within a distance $d_1$ of a point on or in the vehicle 100, e.g., a vehicle 100 center point 220. The center point 220 may be an intersection point of a longitudinal and lateral axis of the vehicle 100. The computer 110 may be further programmed to classify a movement of the mobile device 240 based at least on the determined device presence, as discussed below with reference to FIGS. 3 and 5. The computer 110 may then actuate a vehicle 100 component based on the determined distance $d_1$ and the classified movement of the mobile device 240.

In one example, a person 230 carrying the mobile device 240 may be hiding behind the host vehicle 100. A parking area, e.g., a parking garage 250, may include wall(s) 270, pillar(s) 260, etc., that may offer opportunities for a person 230 to hid. The person 230 could stand near, walk around, and/or depart and return to, the vehicle 100. Thus, the computer 110 may, advantageously, provide information indicating activity of concern to a vehicle 100 user 210, based on presence and/or movements of a proximate mobile device 240.

The computer 110 may be programmed to determine the distance $d_1$ of the mobile device 240 to the vehicle 100, e.g., using techniques such as Free Space Path Loss (FSPL). The computer 110 may be programmed to determine a strength of a wireless signal of a mobile device 240 based on data received from the wireless signal receiver 150. Based on FSPL, a loss (weakening) of an electromagnetic signal over a straight path between a transmitter, e.g., the mobile device 240, and a receiver, e.g., the wireless signal receiver 150, may be proportional to the square of the distance (or distance $d_1$) between the transmitter and receiver, and also proportional to the square of a frequency of the radio signal.

For example, the computer 110 may be programmed to determine the distance $d_1$ upon determining the frequency of signals transmitted by the mobile device 240 and the loss of the signal received by the wireless signal receiver 150. The computer 110 may be programmed to determine the frequency of the received signal based on a frequency associated to a used communication protocol and/or using known Digital Signal Processing (DSP) techniques. The computer 110 may be programmed to determine a loss of the received signal based on determining the output power of the mobile device 240 and the signal strength of the received signal based on data received from the wireless signal receiver 150.

In one example, an output power of the mobile device 240 may be variable. For example, a proximate mobile communication base station may instruct the mobile device 240 to adjust its output power to a value, e.g., based on a distance between the base station and the mobile device 240. The computer 110 may be programmed to determine the output power of the mobile device 240 based on the instruction of the base station to the mobile device 240. In another example, a mobile device 240 may output information identifying an amount of output power.

In one example, based on the determined distance $d_1$ and the classified movement of the mobile device 240, the computer 110 may then actuate a vehicle 100 wireless communication interface to output a message to a device 280 associated with a vehicle 100 user 210 including information, e.g., movement, location, etc., of mobile devices 240 (as discussed below with reference to FIGS. 3-5). The computer 110 may be further programmed to determine a distance $d_2$ of the vehicle 100 user 210, e.g., based on location coordinates received from the device 280 and vehicle 100 GPS sensor 130, and output the message to the device 280 upon determining that the distance $d_2$ is less than a distance threshold, e.g., 200 meters.

The computer 110 may be programmed to classify the movement of the mobile device 240 based on a change of the distance $d_1$ of the mobile device 240, and actuate a vehicle 100 component based at least in part on the classified movement. The computer 110 may be programmed to classify the movement of the mobile device 240 by determining whether the mobile device 240 is stationary, approaching the vehicle 100, moving away from the vehicle 100, repetitively approaching and moving away from the vehicle 100, and circling the vehicle 100. A movement of the mobile device 240 is typically determined relative to the host vehicle 100. Further, the movement of the mobile device 240 may represent a movement of a person 230 carrying the mobile device 240. As one example, a stationary positioning of the mobile device 240 relative to the vehicle 100 may be considered as a class of movement, i.e., zero movement.

Figure 3:
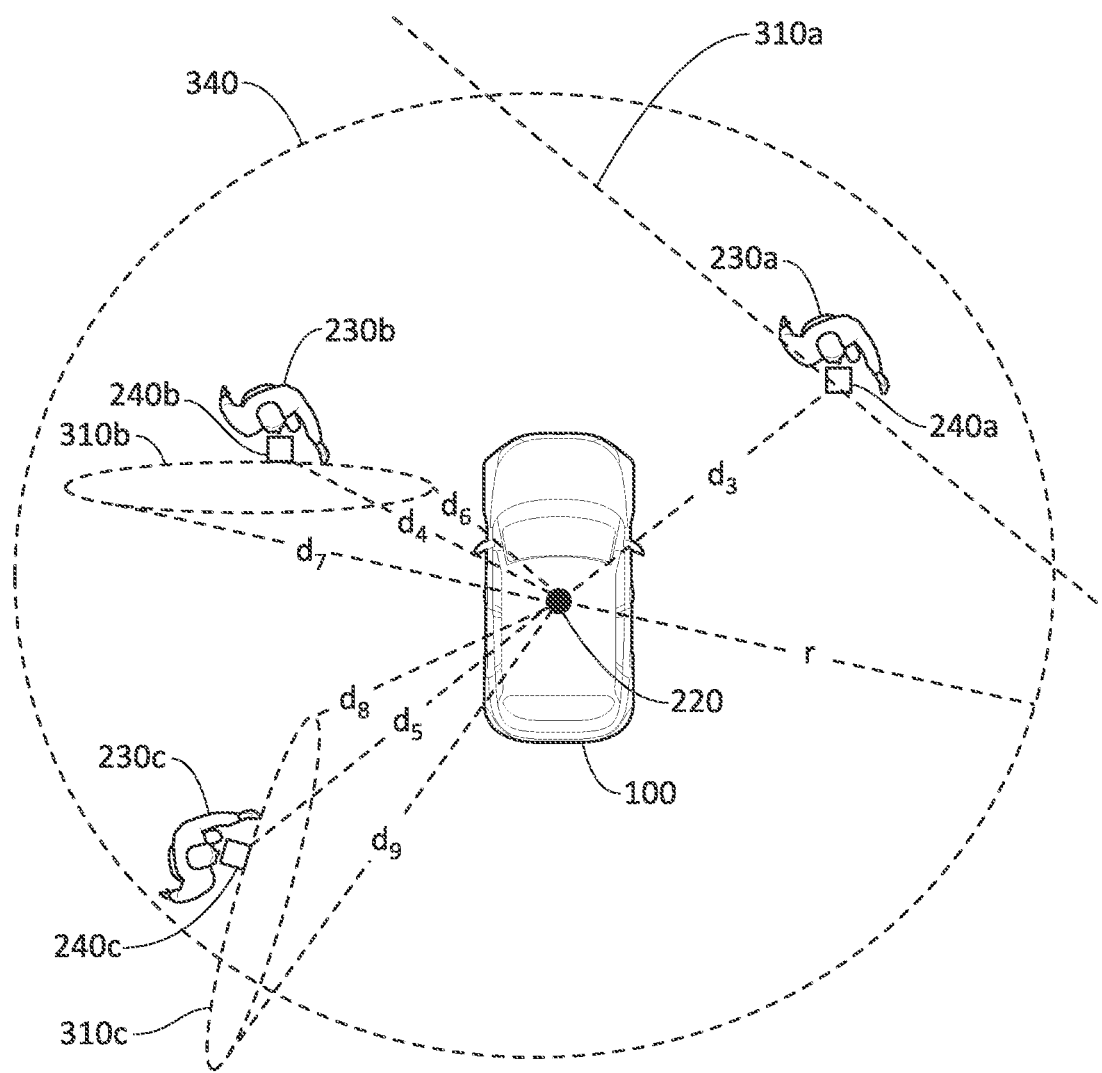
FIG. 3 is a diagram showing the vehicle of FIG. 1 and mobile devices moving relative to the vehicle.
Figure 5:
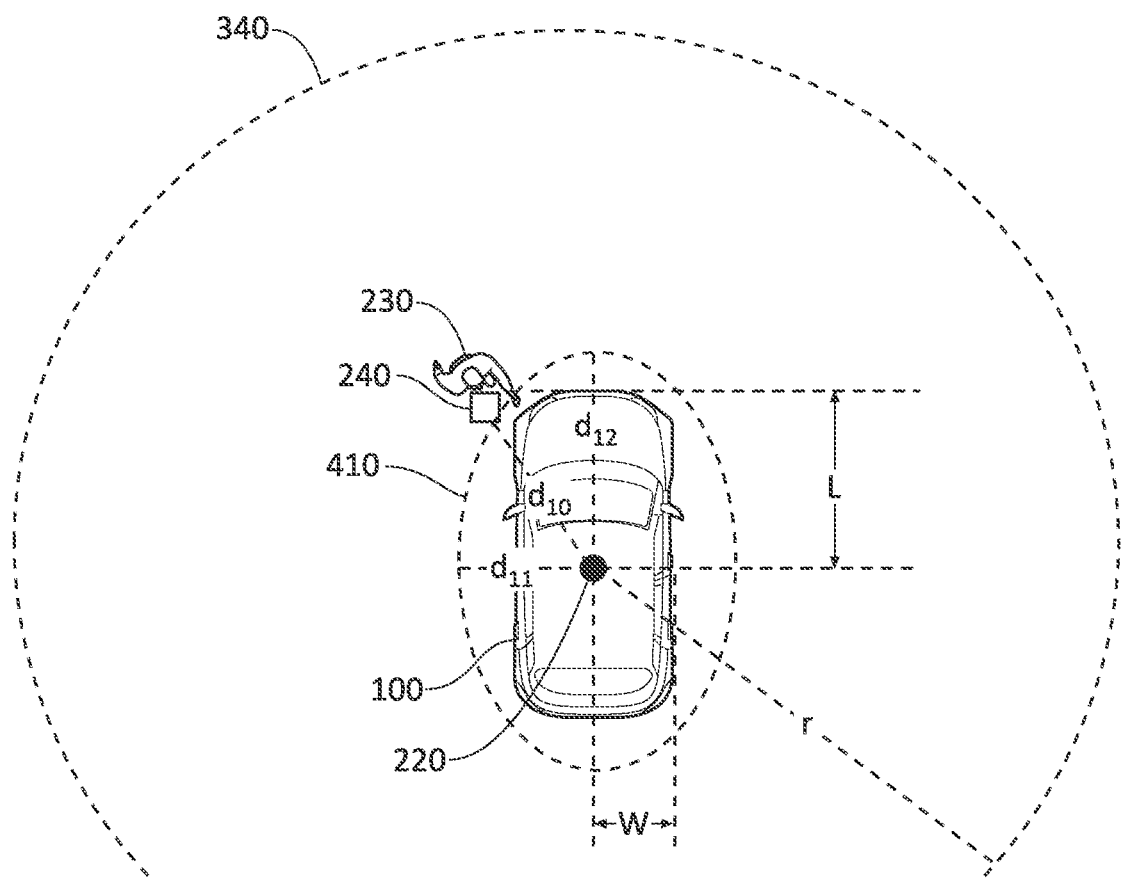
FIG. 5 is a diagram showing the vehicle of FIG. 1 and a mobile device circling the vehicle.

With reference to FIGS. 2, 3 and 5, the computer 110 may be programmed to classify a movement of a mobile device 240 into risk classes C1, C2, C3, and C4 based on input conditions G1, G2, G3, G4, G5, and G6, as described in Tables 1 and 2. Y, N, and X represent satisfied, unsatisfied, and irrelevant conditions, respectively. For example, detecting input condition G1 may be a prerequisite for C1 classification. Thus, tables 1 and 2 represent an example technique for classifying movements of the mobile devices 240; other tables and/or logic may be used to classify the movement of the mobile devices 240.

With reference to FIG. 2, the computer 110 may be programmed to classify a determined presence of a second vehicle 200 mobile device 240 as risk class C1 (i.e., stationary) based on determining that the second vehicles 200 mobile device 240 is non-moving (input condition G1) for a period of time longer than a threshold, e.g., 3 minutes (input G4). In one example, the computer 110 may determine that the second vehicle mobile device 240 is non-moving when a distance between the vehicle 100 and the second vehicle 200 mobile device 240 is constant for at least 3 minutes.

With reference to FIG. 3, the computer 110 may be programmed to receive multiple wireless signals from multiple mobile devices 240a, 240b, 240c (carried by persons 230a, 230b, 230c). The computer 110 may be programmed to determine a distance $d_3$, $d_4$, $d_5$ of each of the mobile devices 240a, 240b, 240c to the vehicle 100 based at least on a respective signal strength. The computer 110 may be programmed to classify the movement of the mobile devices 240a, 240b, 240c on the movement paths 310a, 310b, 310c based at least in part on the determined distance $d_3$, $d_4$, $d_5$ of the respective mobile device 240a, 240b, 240c.

The computer 110 may be programmed to receive and store an identifier of the mobile device(s) 240a, 240b, 240c, e.g., a device identifier, and classify the movement of the mobile device(s) 240a, 240b, 240c on the movement paths 310a, 310b, 310c based at least in part on the stored identifier(s) of the mobile device(s) 240a, 240b, 240c. For example, the computer 110 may be programmed to classify the movement of the mobile devices 240a, 240b, 240c by tracking the mobile devices 240a, 240b, 240c based on the stored identifier of the mobile devices 240a, 240b, 240c.

Figure 4A:
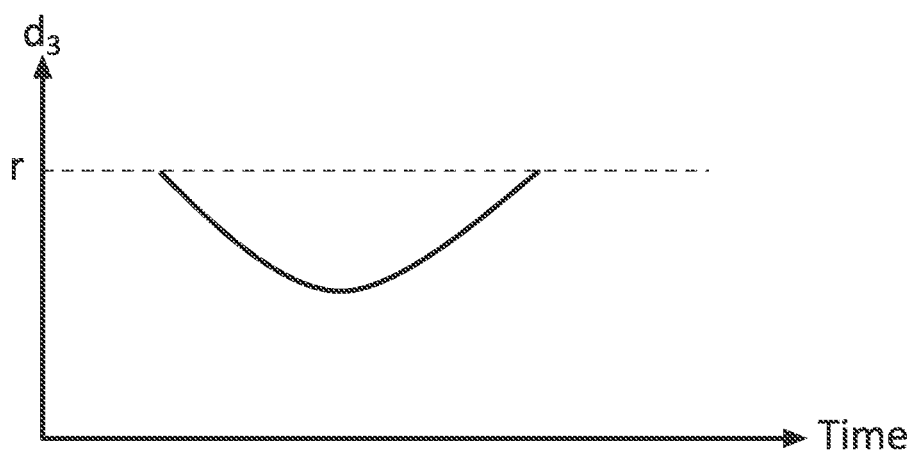
FIGS. 4A-4C are exemplary graphs depicting distance of the mobile devices of FIG. 3.

The computer 110 may be programmed to classify the movement of the mobile device 240a along a movement path 310a based at least in part on the determined distance $d_3$ of the mobile device 240a, as shown in an example graph in FIG. 4A. In one example, the computer 110 may classify the movement along the movement path 310a as a "pass by" risk class C2 based on determining that the mobile device 240 approaches the vehicle 100 once and move away from the vehicle 100 (input condition G5).

TABLE 1

| Input conditions | Description |
| --- | --- |
| G1 | The mobile device 240 is stationary. |
| G2 | Multiple times approaching and moving away from the vehicle 100 detected. |
| G3 | The mobile device 240 moves within an area of L + 50 cm and W + 50 cm. |
| G4 | Time of presence within a range of vehicle 100 exceeds a threshold. |
| G5 | One approaching and moving away detected. |
| G6 | Front camera sensor 130 detect a pedestrian. |
| G7 | Rear camera sensor 130 detects a pedestrian. |
| C1 | Movement classification "stationary" |
| C2 | Movement classification "pass by" |
| C3 | Movement classification "repetitively approaching and moving away" |
| C4 | Movement classification "circling" |

TABLE 2

| Class | G1 | G2 | G3 | G4 | G5 | G6 | G7 | Risk |
|-------|----|----|----|----|----|----|----|------|
| C1 | Y | N | N | Y | X | X | X | Low |
| C2 | N | N | N | N | Y | X | X | Low |
| C3 | N | Y | N | X | N | X | X | Medium |
| C4 | N | Y | Y | Y | N | Y | Y | High |

Figure 4B:
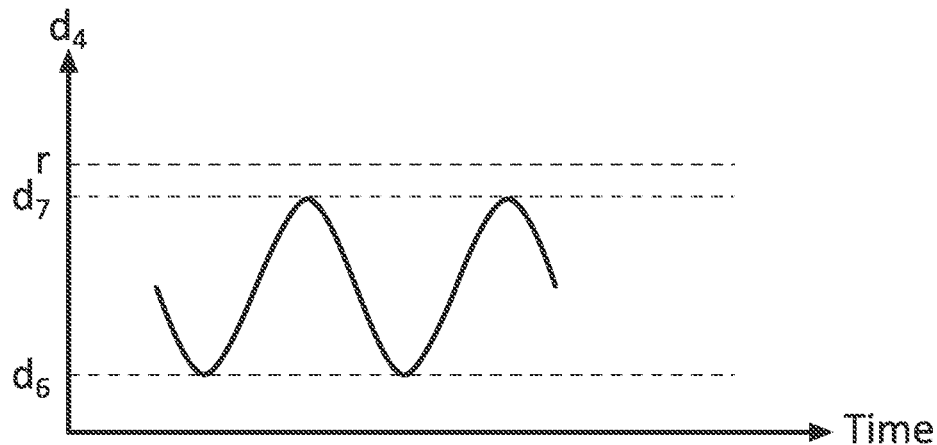

The computer 110 may be programmed to classify the movement of the mobile device 240b along a second movement path 310b based at least in part on the determined distance $d_4$ of the mobile device 240b, as shown in FIG. 4B. The computer 110 may classify the movement as risk class C3 or "approaching and moving away," e.g., based at least in part on determining that the mobile device 240b moves multiple times, e.g., two or more times, between a nearest distance $d_6$ and a farthest distance $d_7$ (input condition G2). In this example, the farthest location on the second path 310b with the distance $d_7$ may be still within a detection range r of the vehicle 100 wireless signal receiver. Thus, the computer 110 may be programmed to track the mobile device 240b during the movements along the second path 310b. In one example, the detection range r is a radius of a detection area, e.g., a circular area 340. Additionally or alternatively, the detection area 340 may have any other shape such as oval, etc. Additionally or alternatively, the computer 110 may classify the movement as C3 upon determining that input condition G2 is satisfied and input conditions G1, G3, and G5 are unsatisfied.

Figure 4C:
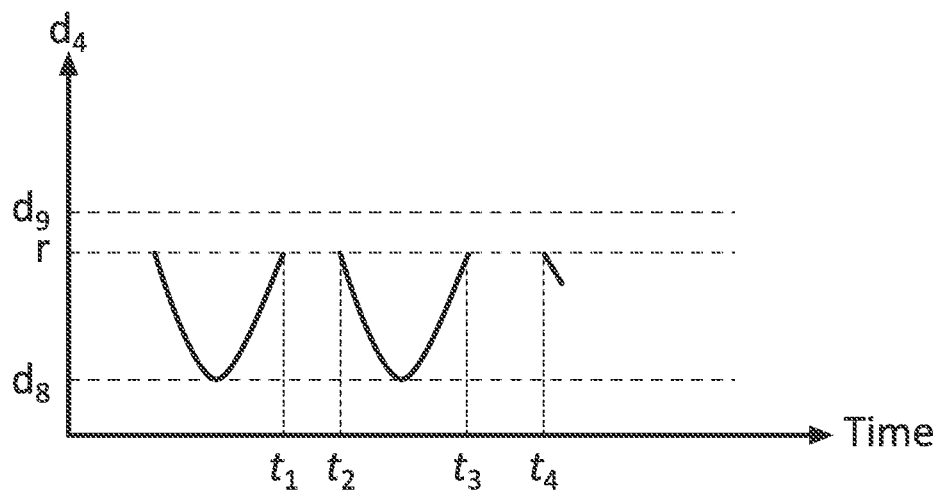

In yet another example, the computer 110 may lack continuous tracking of the mobile device 240c while the mobile device 240c moves along a third path 310c. With reference to FIGS. 3 and 4C, the computer 110 may be programmed to determine whether the mobile device 240c approaches and moves away from the vehicle 100, e.g., two or more times, (risk class C3) by determining whether a newly detected mobile device 240c has been previously detected in a detection range r of the mobile device 240c based on the stored identifier of the mobile device 240c. For example, upon detecting a mobile device at times $t_2$, $t_4$, the computer 110 may determine, based on stored identifiers, that the newly detected mobile device is the mobile device 240c that was tracked up to times $t_1$, $t_3$ respectively.

Figure 6A:
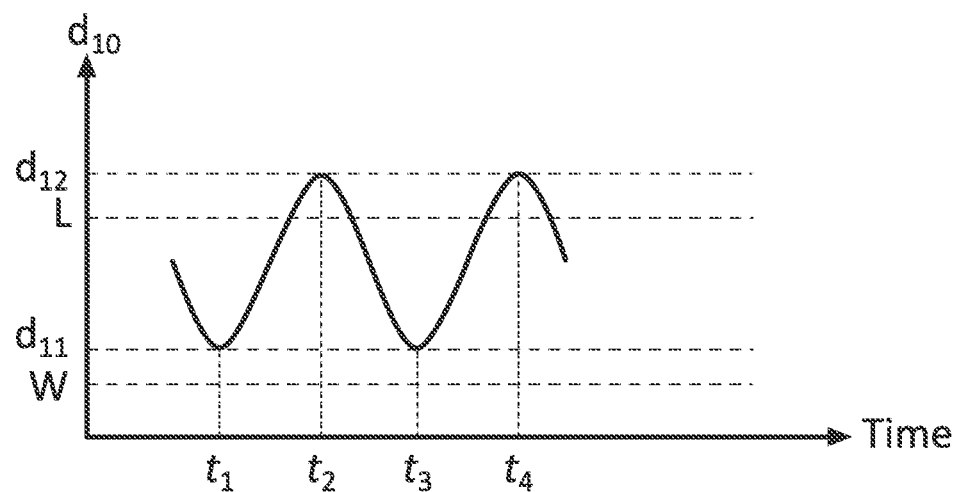
FIG. 6A is an exemplary graph depicting distance of the mobile device of FIG. 5.

With reference to FIGS. 5 and 6A, the computer 110 may be programmed to determine whether a mobile device 240 moves around the vehicle 100 (risk class C4) based on received signal strength associated with the mobile device 240 and vehicle dimensions L, W. The computer 110 may be programmed to determine that the mobile device 240 moves around (circles) the vehicle 100 along a fourth path 410 based on determined distance $d_{10}$. In one example, the computer 110 may determine that the mobile device 240 circles the vehicle 100 when the mobile device 240 moves around the vehicle 100 within an area near vehicle 100 body, e.g., less than 50 cm (centimeter) away from the vehicle 100 body (input condition G3). Thus, the computer 110 may determine that the mobile device 240 circles the vehicle 100 upon determining that the distance $d_{10}$ of the mobile device 240 repetitively, e.g., two or more times, changes between a distance $d_{11}$ and $d_{12}$ (input condition G2). With reference to FIG. 5, $d_{11}$ may be W+50 cm, and die may be L+50 cm. W represents half of vehicle 100 width, L represents half of vehicle 100 length, measured from the vehicle 100 center point 220. In another example, the computer 110 may be programmed to classify the movement of the mobile device 240 as risk class C4 upon determining that the mobile device 240 approaches and move away from the vehicle multiple times (input G2), moving within and area of within an area of L+50 cm and W+50 cm around the vehicle 100 (input condition G3), and is present for more than a time threshold (input condition G4).

Figure 6B:
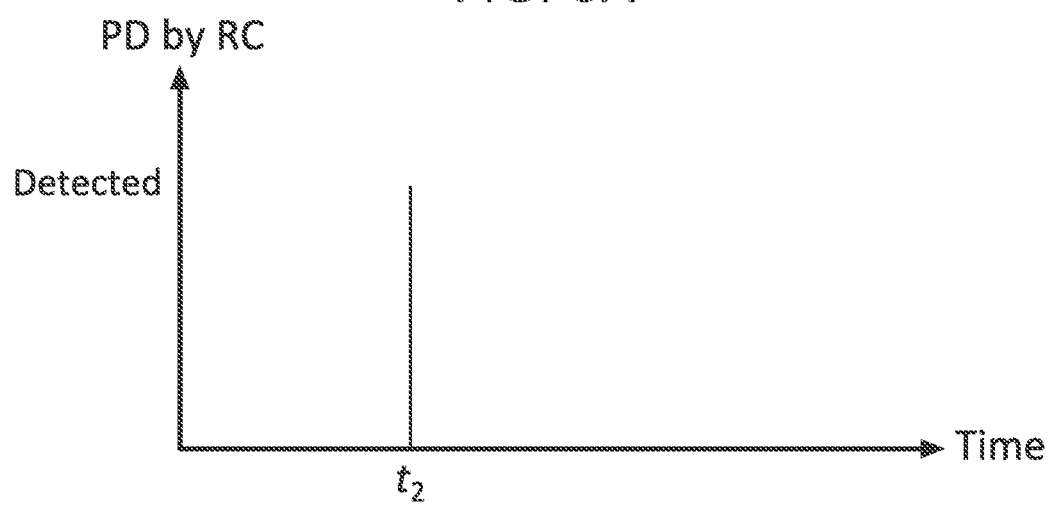
FIG. 6B-6C are exemplary graphs of detecting a person by vehicle sensors.
Figure 6C:
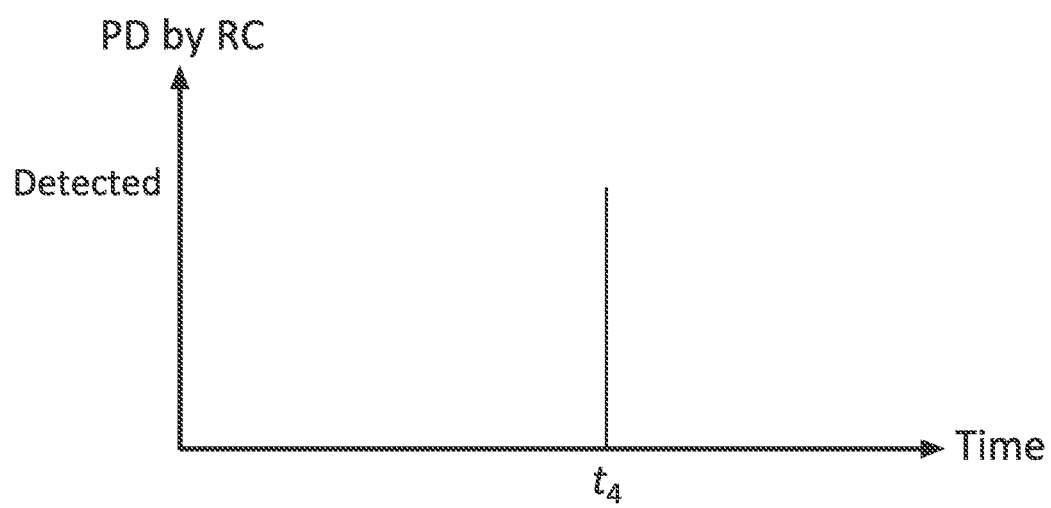

In another example, the computer 110 may be programmed to classify the movement of the mobile device 240 based on data received from the wireless signal receiver 150 and vehicle 100 sensors 130, e.g., pedestrian detection (PD) data from a front camera sensor 130 (FC), a rear camera sensor 130 (RC), etc. As shown in FIGS. 6B-6C, the computer 110 may be programmed to classify that circling movement (risk class C4) of the mobile device 240 along the fourth path 410 based on repetitive change of the distance $d_{10}$ between $d_{11}$ and $d_{12}$, and repetitively detecting a person 230 in front (input condition G5) and/or to the rear (input condition G6) of the vehicle 100. The computer 110 may be further programmed to determine the circling movement (risk class C4) based on the distance $d_{10}$ changing between $d_{11}$ and $d_{12}$ (input condition G2) while detecting the person 230 every other times in a front area (input condition G5) and in a rear area (input condition G6) of the vehicle 100, e.g., at time $t_2$ in the front area of the vehicle 100, and at time $t_4$ in the rear area of the vehicle 100.

As discussed above, the computer 110 may be programmed to actuate one or more vehicle 100 components based on the determined distance and the classified movement of the mobile device 240. For example, the computer 110 may be programmed to actuate a recording device to record image data received from a vehicle 100 camera sensor 130, e.g., recording image data received from the front camera sensor 130 including the person 230 in front of the vehicle 100, as shown in FIG. 5. The computer 110 may be programmed to actuate a vehicle 100 component by activating a vehicle 100 flash light to illuminate. The computer 110 may be programmed to actuate a transmitter, e.g., a wireless communication interface, to transmitting data to a vehicle 100 user device 280, a remote computer 160, etc.

In one example, the computer 110 may be programmed to transmit data including location coordinates of the vehicle 100 and data associated with one or more regions of interest, e.g., to a user 210 mobile device 280. The computer 110 may determine the transmitted data based on one or both of the classified movement of the mobile device 240 and the distance of the mobile device 240 to the vehicle 100. A region of interest, in the context of present disclosure, includes an area (or region) in which presence and/or movement of one or more mobile device(s) 240 may be identified to the vehicle 100 user 210.

For example, the computer 110 may be programmed to determine, e.g., based on input received from the vehicle 100 HMI 140, that a movement classified as circling around the vehicle 100 is an activity of interest, and determine an area in which the mobile device 240 circles the vehicle 100 as a region of interest. A region of interest may include an area with various shapes, based at least on the determined movement of the mobile device(s) 240. In one example shown in FIG. 7, the computer 110 may determine an oval shaped region of interest 520 based on an example fourth movement path 410 shown in FIG. 5. In one example, a region of interest 520 may include an area including the fourth movement path 410 of a mobile device 240 within a predetermined time, e.g., within last 10 minutes. The computer 110 may be further programmed to associate a risk class to a region of interest 520 based on an estimated risk of a movement within the region of interest 520. In one example, when movements of multiple mobile devices 240 are determined within a region of interest 520, the computer 110 may be programmed to determine a risk for the region of interest 520 based on a maximum of risk classes associated with the mobile devices 240.

The computer 110 may be programmed to output a schematic representation including the region of interest 520 to, e.g., a display 510 of the user 210 mobile device 280. The outputted schematic image may include an image 530 indicating the vehicle 100 and one or more regions of interest 520. The computer 110 may be further programmed to output properties of the regions of interest 520 such as dimensions, location relative to the vehicle 100, etc. The computer 110 may be programmed to output multiple regions of interest 520 based on tracking multiple mobile devices 240.

The computer 110 may be further programmed to estimate a risk for the one or more regions of interest 520, e.g., based on classified movements within the regions of interest 520. The computer 110 may be programmed to provide the estimated risk level of each of the one or more regions of interest 520 to the display 510. The risk level may include a "low level," "medium level," and "high level." In one example shown in Table 2, a risk class may be associated with a category of movement. For example, the computer 110 may be programmed to estimate a "high level" risk for a movement of risk class C4 (circling around the vehicle 100). The computer 110 may be programmed to actuate a vehicle 100 component and/or transmit data to the vehicle 100 user 210 based on the estimated risk. Additionally or alternatively, the risk level may be estimated as a percentage of probability, e.g., 30% probability of breaking into the vehicle 100.

The computer 110 may be further programmed to store an identifier of the mobile device(s) 240 upon stopping the vehicle 100 at a location. The computer 110 can then estimate a risk level associated with the mobile device(s) 240 based on the stored identifier and a duration of time that the mobile device 240 is proximate to the vehicle 100.

The computer 110 may be further programmed to estimate a risk level associated with the mobile device 240, based at least in part on a distance of the mobile device 240 to the vehicle 100, the classified movement of the mobile device 240, and a duration of presence of the mobile device 240 in a distance of the vehicle 100. For example, as shown in FIG. 2, second vehicles 200 parked in the parking garage 250 may include mobile devices 240, e.g., a wireless vehicle to vehicle communication interface.

In one example, the computer 110 may estimate a "low level" risk associated with the vehicles 200 devices 240 based on determining that the vehicles 200 devices 240 are detected upon entering the parking garage and/or determining that the vehicles 200 devices 240 are stationary (C1) relative to the vehicle 100. The computer 110 may be programmed to prevent an introduction of a region of interest for a second vehicle 200 device 240 based on a determined "low level" risk of the second vehicle 200 device 240.

In another example as shown in FIG. 3, the computer 110 may be programmed to estimate a "low level" risk for the mobile device 240a with the movement path 310a, e.g., based on configuration data associating a "low level" risk to the "passing by" class (C2) of movement. In one example, the computer 110 may be programmed to receive configuration data from the HMI 140 associating the "low level" risk to the "passing by" class of movement.

The computer 110 may be programmed to receive location coordinates of a user device such as the mobile device 280 associated with the vehicle 100. The computer 110 may then estimate a risk associated with the mobile device(s) 240 based at least in part on one of the distance of the mobile device(s) 240 to the vehicle 100 and the classified movement of the mobile device(s) 240. The computer 110 may be further programmed to transmit an alert to the user 210 mobile device 280 upon determining, based on the received location coordinates, that a distance $d_2$ between the user 210 device 280 and the vehicle 100 is less than a distance threshold, e.g., 200 meters, and/or the estimated risk level exceeds a predetermined risk threshold, e.g., the "medium level."

Processing

Figure 8A:
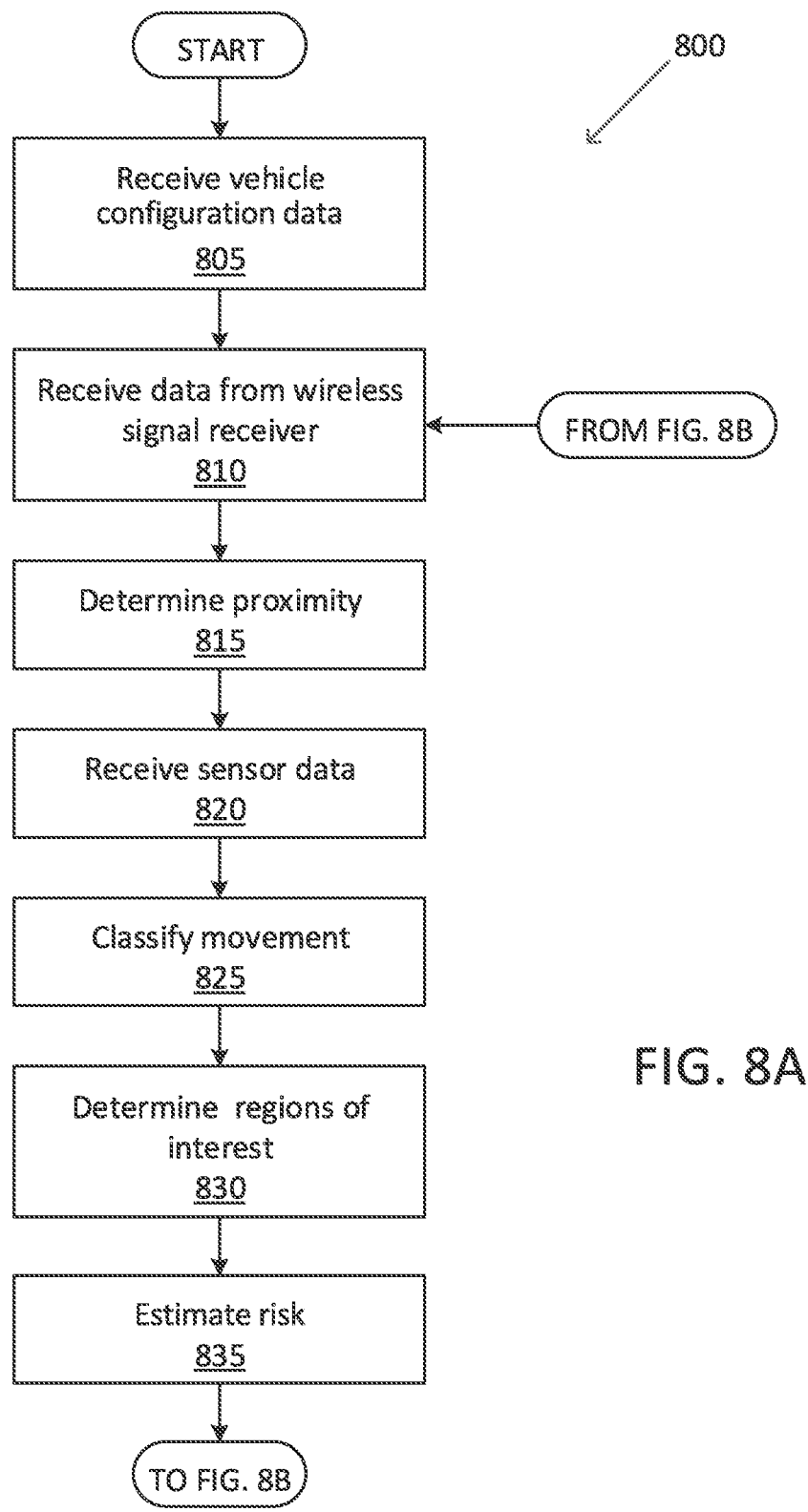
FIGS. 8A and 8B are a flowchart of an exemplary process for monitoring movements of mobile devices.
Figure 8B:
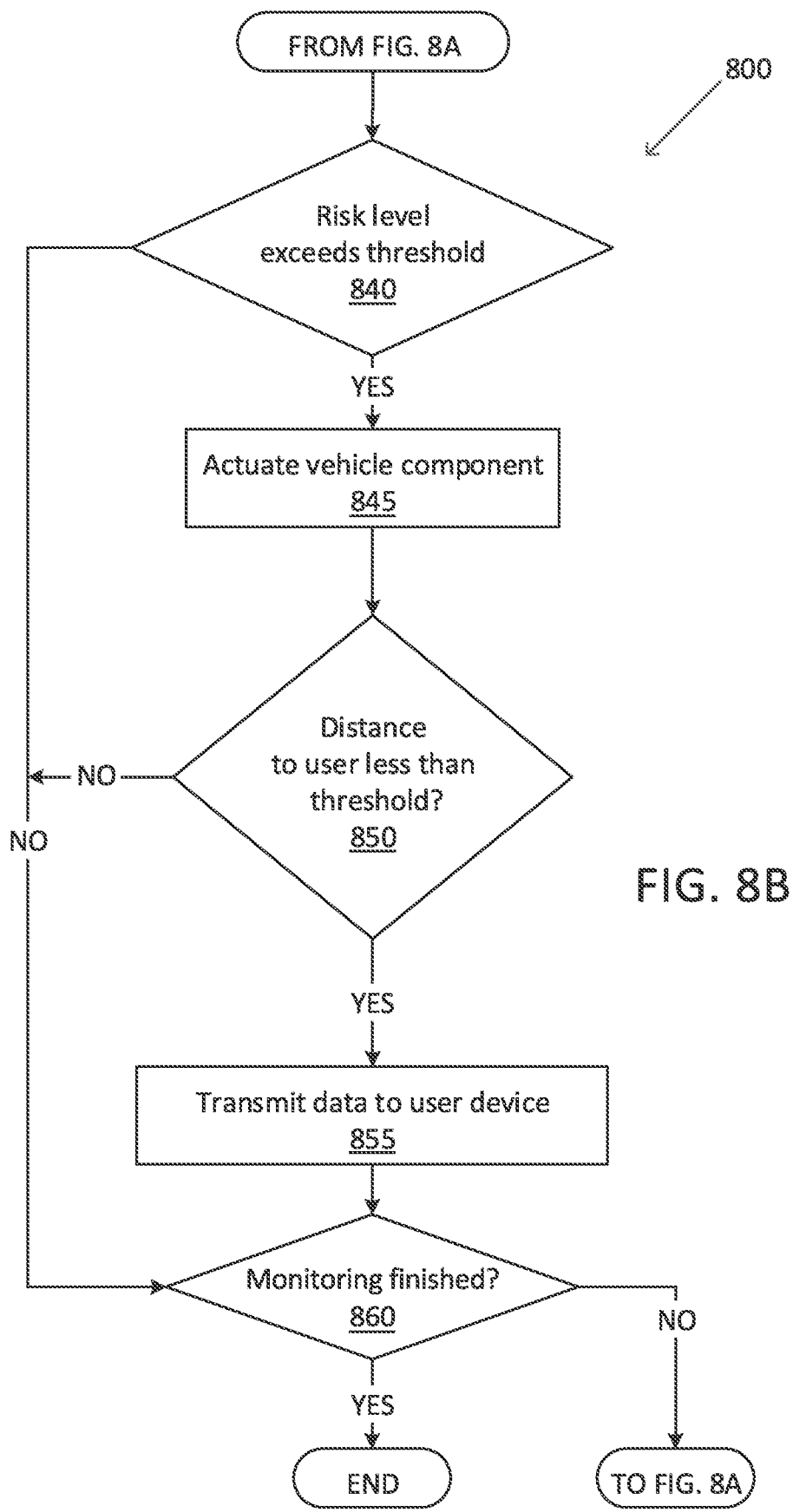

FIGS. 8A-8B illustrate an example process 800 for monitoring movements of mobile devices 240, and causing actions, e.g. based on activities such as circling the vehicle 100. In one example, the vehicle 100 computer 110 may be programmed to execute blocks of the process 800. Additionally or alternatively, the remote computer 160, the user 210 mobile device 280, etc., or a combination thereof may be programmed to execute the blocks of the process 800.

With reference to FIG. 8A, the process 800 begins in a block 805, in which the computer 110 receives vehicle 100 configuration data. For example, the computer 110 may be programmed to receive configuration data, e.g., via the vehicle 100 HMI 140, including an identifier of a mobile device 280 associated with the vehicle 100. The computer 110 may be programmed to receive configuration data including a risk threshold for, e.g., actuating a vehicle 100 component based on the risk. The computer 110 may be programmed to receive data including a distance threshold for a distance $d_2$ between the vehicle 100 and the user 210 (see FIG. 2). The computer 110 may be programmed to receive configuration data associating classes of movements with risk levels, e.g., associating a "pass by" movement with the "low level" risk. For example, configuration data may include an association of risk levels to classes of movement, as described in Table 2.

Next, in a block 810, the computer 110 receives one or more wireless signals from the wireless signal receiver 150. The computer 110 may be programmed to receive data including a signal strength, a signal frequency, an identifier of the respective mobile device 240 transmitting the wireless signal, etc.

Next, in a block 815, the computer 110 determines a distance of the mobile device 240 to the vehicle 100, e.g., a distance $d_1$ as shown in FIG. 2, based on the received wireless signal. The computer 110 may be programmed to determine a distance of each of multiple mobile devices 240 based on received wireless signals from each of the multiple mobile devices 240.

Next, in a block 820, the computer 110 receives sensor data. For example, the computer 110 may receive data from a vehicle 100 camera sensor 130 including pedestrian detection data. The computer 110 may receive location coordinates of the user 210 mobile device 280 from the mobile device 280 GPS sensor.

Next, in a block 825, the computer 110 classifies movement(s) of the mobile device(s) 240 based at least in part on the determined distance of the mobile devices 240. An another example, the computer 110 may classify the movements of the mobile devices 240 based on the determined proximities and the received sensor data, e.g., the vehicle 100 front camera sensor 130.

Figure 7:
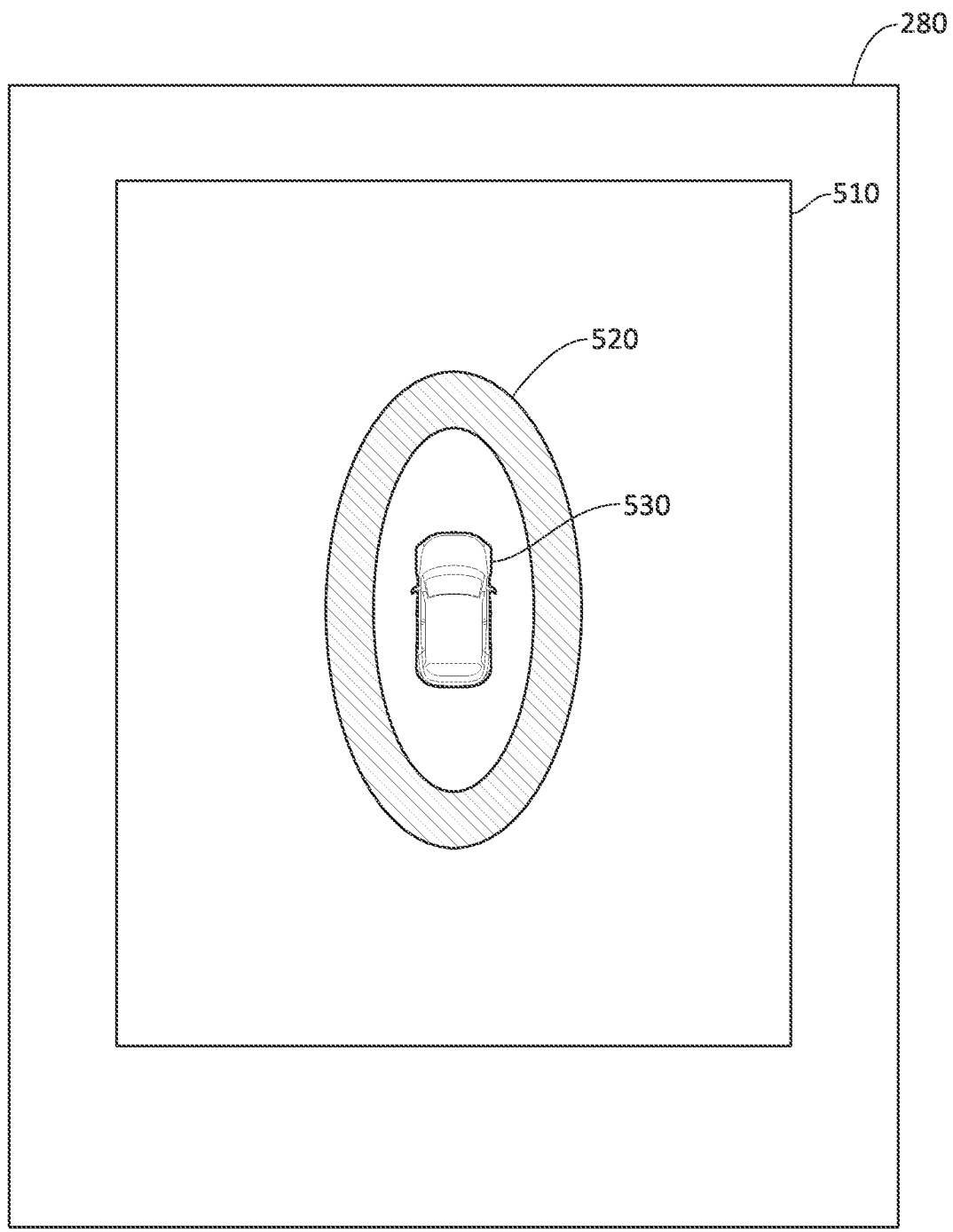
FIG. 7 illustrates a display device that outputs a schematic picture showing the vehicle and a region of interest around the vehicle.

Next, in a block 830, the computer 110 determines regions of interest. For example, the computer 110 may be programmed to determine the region of interest 520, as shown in FIG. 7, based on the classified circling movement (risk class C4) of the mobile device 240, as shown in FIG. 5.

Next, in a block 835, the computer 110 estimates a risk level associated with a classified movement of a mobile device 240. In another example, the computer 110 may be programmed to classify movements of multiple mobile devices 240 and estimate multiple risk levels, each associated with one of the classified movements. The computer 110 may be programmed to estimate the risk level based on classification of a movement of a mobile device 240, a distance of the mobile device 240 to the vehicle 100, received configuration from the vehicle 100 HMI 140, etc.

Turning to FIG. 8B, next, in a decision block 840, the computer 110 determines whether the estimated risk level associated with the classified movement of the mobile device 240 exceeds a risk threshold, e.g., the "medium level." In another example, when the computer 110 tracks movements of multiple mobile devices 240, the computer 110 may be programmed to determine whether at least a risk level associated with one of the multiple mobile devices 240 exceeds the risk threshold. If the computer 110 determines that the risk level associated with a mobile device 240 exceeds the risk threshold, then the process 800 proceeds to a block 845; otherwise the process 800 proceeds to a decision block 860.

In the block 845, the computer 110 actuates a vehicle 100 component. For example, the computer 110 may actuate an image recorder to record image data including a person 230 carrying the mobile device 240. In another example, the computer 110 may actuate the vehicle 100 flash lights based on determining that a mobile device 240 is circling the vehicle 100, e.g., to deter a potentially suspicious person 230.

Next, in the decision block 850, the computer 110 determines whether a distance $d_2$ between the user 210 mobile device 280 and the vehicle 100 is less than the distance threshold (see FIG. 2). If the computer 110 determines that the distance $d_2$ is less than the distance threshold, then the process 800 proceeds to a block 855; otherwise the process 800 proceeds to the decision block 860.

In the block 855, the computer 110 transmits data to, e.g., the user 210 device 280. For example, the computer 110 may be programmed to transmit a schematic picture including the regions of interest 520 to the mobile device 280. Additionally or alternatively, the computer 110 may transmit a notification, classification of movement, distance of mobile devices 240 to the vehicle 100, etc. to the user 210 device 280, the remote computer 160, etc.

In the decision block 860, the computer 110 determines whether a monitoring of the mobile devices 240 is finished. In one example, the computer 110 may determine that the monitoring of the mobile devices 240 is finished based on vehicle 100 speed, e.g., exceeding a speed threshold such as 30 km/h, and/or a vehicle 100 location, e.g., on a freeway. If the computer 110 determines that the monitoring of the mobile devices 240 is finished, then the process 800 ends; otherwise the process 800 returns to the block 810 (see FIG. 8A).

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, programmed to:
  receive, via a vehicle wireless receiver, a wireless signal from a mobile device at a time that the vehicle is stopped;
  determine a presence of the mobile device within a distance of the vehicle;
  classify a movement of the mobile device based at least on the determined device presence;
  estimate a risk level associated with the mobile device based on the classified movement, a stored identifier of the mobile device, the presence of the mobile device within the distance of the vehicle, and a duration of time that the mobile device is proximate to the vehicle; and actuate a vehicle component based on the risk level.

2. The computer of claim 1, further programmed to classify the movement of the mobile device based on a change of the distance of the mobile device over time, and actuate the vehicle component based at least in part on the classified movement.

3. The computer of claim 1, wherein classifying the movement of the mobile device further includes determining whether the mobile device is at least one of stationary, approaching the vehicle, moving away from the vehicle, repetitively approaching and moving away from the vehicle, and circling the vehicle.

4. The computer of claim 3, further programmed to determine whether a mobile device circles the vehicle based on received signal strength associated with the mobile device and vehicle dimensions.

5. The computer of claim 1, further programmed to receive and store an identifier of the mobile device, and classify the movement of the mobile device based at least in part on the stored identifier of the mobile device.

6. The computer of claim 5, further programmed to classify the movement of the mobile device by tracking the mobile device based on the stored identifier of the mobile device.

7. The computer of claim 5, further programmed to determine whether the mobile device approaches and moves away from the vehicle two or more times by determining whether a newly detected mobile device has been previously detected in a detection range of the mobile device partially based on the stored identifier of the mobile device.

8. The computer of claim 1, further programmed to:
receive a plurality of respective wireless signals from each of a plurality of mobile devices;
determine a distance of each of the plurality of mobile devices to the vehicle based at least on a respective signal strength; and
classify the movement of each of the plurality of the mobile devices based at least in part on the determined distance of the respective mobile device.

9. The computer of claim 1, wherein actuating the vehicle component further includes actuating at least one of a recording device to record image data received from a vehicle camera, a transmitter to transmit data to a vehicle owner device, a second computer, and a vehicle flash light to illuminate.

10. The computer of claim 9, wherein the transmitted data further includes location coordinates of the vehicle and data associated with one or more regions of interest determined based on one or both of the classified movement of the mobile device and the distance of the mobile device to the vehicle.

11. The computer of claim 10, further programmed to estimate a risk level for the one or more regions of interest, and to transmit the estimated risk level of each of the one or more regions of interest to a display device.

12. The computer of claim 1, further programmed to estimate a risk associated with the mobile device based at least in part on one of a distance of the mobile device to the vehicle, the classified movement of the mobile device, and a duration of presence in a distance of the vehicle.

13. The computer of claim 1, further programmed to:
receive location coordinates of a user device associated with a vehicle;
estimate a risk associated with the mobile device based at least in part on one of the distance of the mobile device to the vehicle and the classified movement of the mobile device; and
transmit an alert to the user device upon determining, based on the received location coordinates, that a distance between the user device and the vehicle is less than a distance threshold, and the estimated risk exceeds a predetermined risk threshold.

14. A method, comprising:
receiving, via a vehicle wireless receiver, a wireless signal from a mobile device at a time that the vehicle is stopped;
determining a presence of the mobile device within a distance of the vehicle;
classifying a movement of the mobile device based at least on the determined device presence;
estimating a risk level associated with the mobile device based on the classified movement, a stored identifier of the mobile device, the presence of the mobile device within the distance of the vehicle, and a duration of time that the mobile device is proximate to the vehicle; and
actuating a vehicle component based on the risk level.

15. The method of claim 14, wherein classifying the movement of the mobile devices is based on a change of the distance of the mobile device over time.

16. The method of claim 14, wherein classifying the movement of the mobile device further includes determining whether the mobile device is at least one of stationary, approaching the vehicle, moving away from the vehicle, repetitively approaching and moving away from the vehicle, and circling the vehicle.

17. The method of claim 14, further comprising:
receiving a plurality of respective wireless signals from each of a plurality of mobile devices;
determining a distance of each of the plurality of mobile devices to the vehicle based at least on a respective signal strength; and
classifying the movement of each of the plurality of the mobile devices based at least in part on the determined distance of the respective mobile device.

18. The method of claim 14, wherein actuating the vehicle component further includes actuating at least one of a recording device to record image data received from a vehicle camera, a transmitter to transmit data to a vehicle owner device, a second computer, and a vehicle flash light to illuminate.

19. The method of claim 14, further comprising:
estimating a risk level for one or more regions of interest; and
transmitting the estimated risk level of each of the one or more regions of interest to a display device.

20. A computer, programmed to:
receive, via a vehicle wireless receiver, a wireless signal from a mobile device;
determine a presence of the mobile device within a distance of the vehicle;
classify a movement of the mobile device based at least on the determined device presence;
store an identifier of the mobile device upon stopping the vehicle in a location;

estimate a risk level associated with the mobile device based on the stored identifier and a duration of time that the mobile device is proximate to the vehicle; and actuate a vehicle component based on the determined device presence and the classified movement of the mobile device.

\* \* \* \* \*